(12) United States Patent
Collins et al.

(10) Patent No.: US 9,311,414 B2
(45) Date of Patent: Apr. 12, 2016

(54) SYSTEMS AND METHODS OF SELECTING CONTENT BASED ON AGGREGATE ENTITY CO-OCCURRENCE

(71) Applicant: Google Inc., Mountain View, CA (US)

(72) Inventors: Alexander Collins, San Francisco, CA (US); Brandon Bilinski, San Francisco, CA (US)

(73) Assignee: Google Inc., Mountain View, CA (US)

( * ) Notice: Subject to any disclaimer, the term of this patent is extended or adjusted under 35 U.S.C. 154(b) by 308 days.

(21) Appl. No.: 13/918,761

(22) Filed: Jun. 14, 2013

(65) Prior Publication Data
US 2014/0372468 A1 Dec. 18, 2014

(51) Int. Cl.
G06F 17/30 (2006.01)

(52) U.S. Cl.
CPC .... *G06F 17/30867* (2013.01); *G06F 17/30522* (2013.01)

(58) Field of Classification Search
None
See application file for complete search history.

(56) References Cited

U.S. PATENT DOCUMENTS

| 8,515,810 B2 * | 8/2013 | Grimes | G06Q 30/02 705/14.15 |
|---|---|---|---|
| 2007/0124425 A1 * | 5/2007 | Gross | 709/217 |
| 2008/0249853 A1 * | 10/2008 | Dekel | G06Q 30/00 705/14.48 |
| 2008/0249855 A1 | 10/2008 | Collins et al. | |
| 2009/0299998 A1 | 12/2009 | Kim | |
| 2011/0295678 A1 | 12/2011 | Seldin et al. | |
| 2014/0122234 A1 * | 5/2014 | Wald | G06Q 30/0256 705/14.54 |

OTHER PUBLICATIONS

Wu et al., "Aggregate Two-way Co-clustering of Ads and User Analysis for Online Advertisements," Computer Symposium (ICS), Dec. 16, 2010, pp. 587-593.

* cited by examiner

*Primary Examiner* — Belix M Ortiz Ditren
(74) *Attorney, Agent, or Firm* — Foley & Lardner LLP; John D. Lanza; James De Vellis

(57) ABSTRACT

The present disclosure relates to systems and methods for refining content selection criteria to facilitate content selection via a computer network. In some embodiments, a tool identifies a first entity used to select content of a first content provider. The first entity can correspond to a canonical stable identifier in a database. The tool can identify a plurality of sets of entities that each comprise the first entity and an additional entity different from the first entity. Each of the plurality of sets of entities can be associated with content of a corresponding content provider. The tool can determine a performance metric for the additional entity. The tool can compare the performance metric with a performance threshold. The tool can associate the additional entity with the content of the first content provider based on the comparison.

20 Claims, 4 Drawing Sheets

SYSTEMS AND METHODS OF SELECTING CONTENT BASED ON AGGREGATE ENTITY CO-OCCURRENCE

BACKGROUND

In a networked environment such as the internet, web publishers such as people or companies can provide information for display on web pages or other documents. The web pages can include text, video, or audio information provided by the entities via a web page server for display on the internet. Content providers, such as third party advertisers, can provide additional content for display on the web pages together with the information provided by the web publishers. A content selection server may select certain additional content to display on a rendering of a web page based on various factors including, e.g., content selection criteria associated with the content to be displayed. Thus, a person viewing a web page can access the information that is the subject of the web page, as well as selected third party content that may appear with the web page.

SUMMARY

Systems and methods of the present disclosure relate generally to automatically suggesting additional content selection criteria for content providers in order to increase coverage for their content. In some implementations, the present technology may suggest relevant content selection criteria based on the co-occurrence of at least one content selection criteria in content groups of a plurality of content providers.

At least one aspect is directed to a method for refining content selection criteria to facilitate content selection via a computer network. In one implementation, the method includes identifying a first entity used to select content of a first content provider. An aggregator of a tool executing on a server may identify the first entity used to select content. The first entity can correspond to a canonical stable identifier in a database, the identifier indicating an entity classification. The method can include the aggregator identifying a plurality of sets of entities that each comprise the first entity and an additional entity different from the first entity. Each of the plurality of sets of entities can be associated with content of a corresponding content provider. For example, a second content provider may use the first entity and a second entity to select content; a third content provider may use the first entity, second entity and third entity to select content; and a fourth content provider may use the first entity, second entity, third entity and fourth entity. The aggregator may identify that these three sets of entities corresponding to the second, third and fourth content providers. The method can include determining a performance metric for the additional entity. For example, an entity evaluator of the tool can determine a click through rate or conversion rate for the second entity, third entity or fourth entity. The method can include comparing the performance metric with a performance threshold. For example, a selection criteria generator of the tool can compare a click through rate with a click through rate threshold. The method can include associating, based on the comparison, the additional entity with the content of the first content provider. For example, the content selection criteria generator can associate the additional entity with the content selection criteria of the first content provider if the click through rate is greater than the click through rate threshold.

In some implementations, the method can include transmitting the additional entity to the first content provider. For example, the additional entity can be transmitted to a display device of the first content provider via a user interface. The method can include receiving an indication from the first content provider to associate the additional entity with the content of the first content provider. For example, the content selection criteria generator may receive an indication from the first content provider to add the additional content to content selection criteria for the content of the first content provider.

In some implementations, the method can include comparing, by, e.g., the content selection criteria generator, the performance metric with a dynamic performance threshold. In some implementations, the method can include determining, by, e.g., the content selection criteria generator, the dynamic performance threshold based on performance feedback.

In some implementations, the method can include determining, by, e.g., the content selection criteria generator, that the frequency of occurrence of the additional entity is above a frequency threshold. The method can include associating the additional entity with the content of the first content provider. For example, responsive to the determination, the content selection criteria generator can associate the additional entity with the content of the first content provider.

In some implementations, the method can include the tool determining an additional performance metric. The tool may determine the additional performance metric responsive to the determination that the frequency of unique occurrences of the additional entity is above the frequency threshold, determining an additional performance metric.

In some implementations, the method can include entering an offline mode. The method can include storing a table in a database. The table can include the association between the first entity and the additional entity. In some implementations, the method can include storing, in the table, the additional entity responsive to the additional entity satisfying the performance threshold.

In some implementations, the first content provider and each of the corresponding content providers are associated with an industry vertical.

At least one aspect is directed to a system for refining content selection criteria to facilitate content selection via a computer network comprising. In some implementations, the system can include an aggregator, executing on a server, that is configured to identify a first entity used to select content of a first content provider. For example, the first entity can correspond to a canonical stable identifier in a database. The aggregator can be further configured to identify a plurality of sets of entities that each comprise the first entity and an additional entity different from the first entity. For example, each of the plurality of sets of entities can be associated with content of a corresponding content provider. The system can include an entity evaluator configured to determine a performance metric for the additional entity. The system can include a selection criteria generator configured to compare the performance metric with a performance threshold. The content selection criteria generator can be further configured to associate, based on the comparison, the additional entity with the content of the first content provider.

In some implementations, the system can include a communication interface configured to transmit, to the first content provider, based on the comparison, the additional entity. The content selection criteria generator can be further configured to receive an indication from the first content provider to associate the additional entity with the content of the first content provider.

In some implementations, the content selection generator can be further configured to compare the performance metric with a dynamic performance threshold. In some implementations, the content selection criteria generator can be configured to determine the dynamic performance threshold based on performance feedback. For example, the content selection criteria generator may determine that using top five performing additional entities to select content does not improve the performance of the content as compared to using a top three performing additional entities. Thus, the content selection criteria generator may identify only the top three performing additional entities.

In some embodiments, the content selection criteria generator can be further configured to determine that the frequency of occurrence of the additional entity is above a frequency threshold. The content selection criteria generator can be configured to associate the additional entity with the content of the first content provider. For example, the content selection criteria generator can associate the additional entity responsive to the determination.

At least one aspect is directed to a non-transitory computer readable storage medium having instructions to refine content selection criteria to facilitate content selection via a computer network. In some implementations, the instructions can include instructions to identify a first entity used to select content of a first content provider, the first entity corresponding to a canonical stable identifier in a database. The instructions can include instructions to identify a plurality of sets of entities that each comprise the first entity and an additional entity different from the first entity. Each of the plurality of sets of entities can be associated with content of a corresponding content provider. The instructions can include instructions to determine a performance metric for the additional entity. The instructions can include instructions to compare the performance metric with a performance threshold. The instructions can include instructions to associate based on the comparison, the additional entity with the content of the first content provider.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
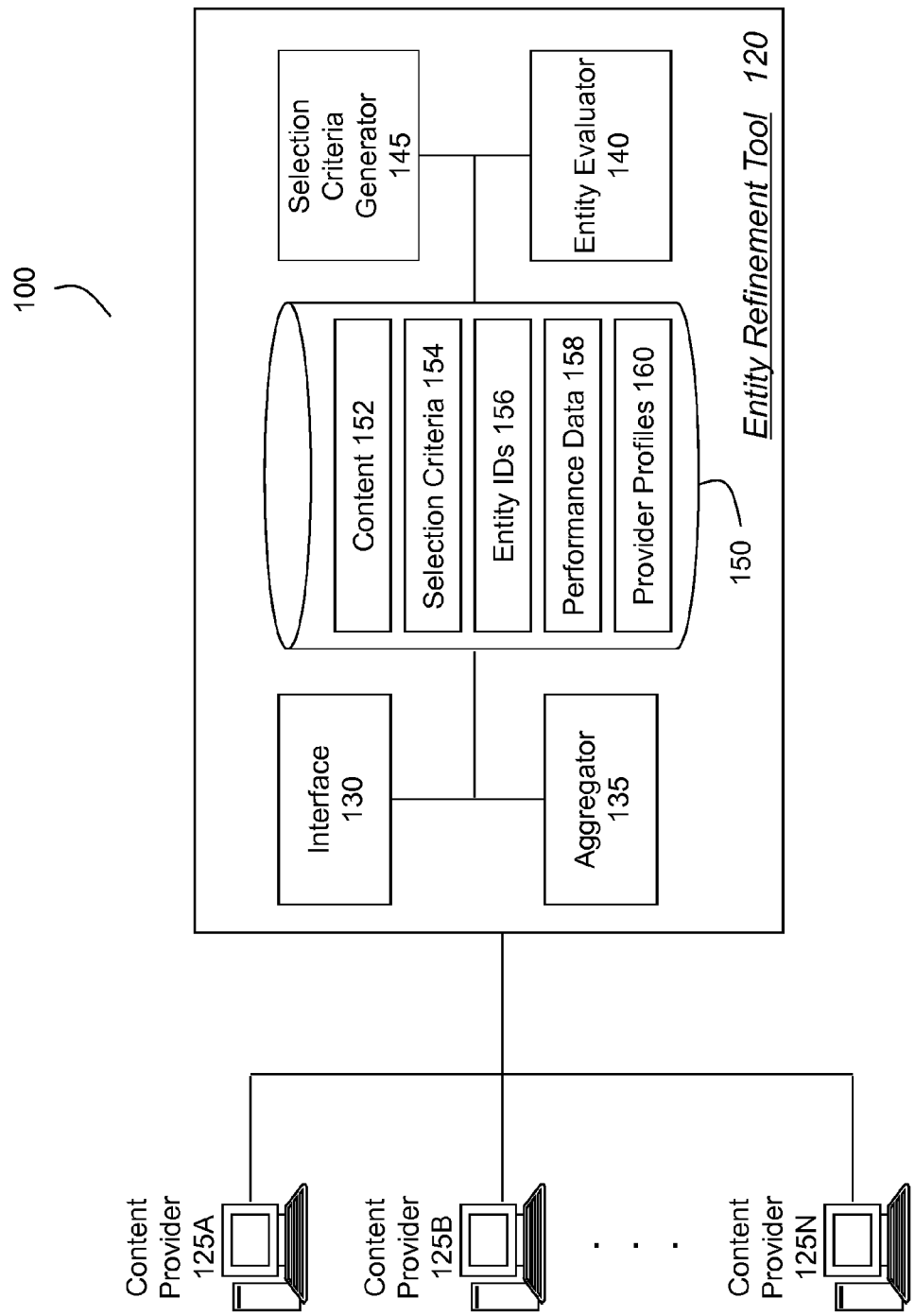
FIG. 1 is an illustration of one implementation of a system for refining content selection criteria to facilitate content selection via a computer network.

Systems and methods of the present disclosure relate generally to an entity refinement tool ("tool") that automatically suggests additional content selection criteria for content providers in order to increase coverage for their content by increasing the likelihood that their content is selected for display with a document (e.g., online web page, application, etc.). In some implementations, the tool may suggest relevant content selection criteria based on the co-occurrence of at least one content selection criteria in content groups of a plurality of content providers.

An entity is a named entity in the physical world such as a specific location, person, group of people, or media content (e.g., movies, songs, etc.). Each entity is capable of an independent existence and includes a unique identifier that distinguishes among multiple entities with similar names (e.g., a Jaguar car versus a jaguar animal). Keywords, unlike entities, refer to terms or phrases and can ambiguously refer to multiple entities in the physical world (e.g., the keyword "jaguar" is ambiguous because it does not identify the car versus the animal; while the entity Jaguar includes a unique identifier identifying one of the car or the animal as well additional attributes for the entity and information about relationships with other entities).

Each entity includes at least one attribute that provides additional information about the entity, such as a date of birth for an author (e.g., AuthorTable(AUTHOR_ID, AuthorName, CountryBorn, YearBorn). Each entity also includes a minimal set of uniquely identifying attributes, which can be referred to as the entity's primary key or unique key (e.g., the AUTHOR_ID or an international standard book number ("ISBN")). The primary key can consist of a single attribute or multiple attributes in combination.

Each entity has a corresponding relationship with at least one other entity. The relationship indicates how one entity is related to another entity (e.g., an artist performs a song, where the artist is a first entity corresponding to an instance of entity-type people, the song is a second entity which is an instance of entity-type media content, and the relationship linking the entities is performs). In a relational database, the unique key can uniquely identify each row of data values in a database table.

Entities are categorized or structured using an ontological classification that includes one or more of classes, sets, collections, concepts, or entity-types. An entity can be referred to as an instance of an entity-type, where an entity-type is a category. Ontological classifications can also include one or more of attributes, aspects, properties, features, characteristics, or parameters of or related to an entity. An ontology of "vehicle" can include: entity-type—ground vehicle, ship, air craft; function—to carry persons, to carry freights; attribute—power, size; component—engine, body, etc. The classification may also include structured data that provides a taxonomy of entities. Entities may be associated with an entity-type, such as people, places, books, or films. Entity-types may include additional properties, such as date of birth for a person or latitude and longitude for a location, for example. Entities may be classified, at least in part, by one or more humans ("entity contributors") using online or offline crowd sourcing processes.

Entities can be associated with domains, such as a collection of entity-types that share a namespace, which includes a directory of uniquely named objects (e.g., domain names on the internet, paths in a uniform resource locator, or directors in a computer file system). The entities can include metadata that describes properties (or paths formed through the use of multiple properties) in terms of general relationships. An entity may include a domain American football and include an ID "/american_football". This domain may be associated with a head coach type with ID "/American_football/football_coach". This type may include a property for current team head coached with ID "/American_football/football_coach/current_team_head_coached". Each domain, type, property or other category may include a description. For example, "/American_football/football_coach" may include the following description: "'Football Coach' refers to coaches of the American sport Football."

In one implementation, a first content provider (e.g., an online movie ticket vendor) may display content (e.g., text, images, audio, video, multimedia, documents, advertisements, etc.) related to an upcoming movie release. The content group (e.g., AdGroup) may include the content (e.g., advertisement or creatives) and a structured list of selection criteria that includes entities, where a structured list may include a list with sublists. The entity corresponds to a named entity in the physical world such as a specific location, person, group of people, media content (e.g., movies, songs, etc.), or the like. In one implementation, the content group may include an advertisement for the movie and the selection criteria may include an entity representing the new movie (e.g., the title of the movie). In order to identify and suggest additional closely related selection criteria, the tool may identify a plurality of content providers that also use the same entity for content selection (e.g., a content group of the content provider may be associate with content selection criteria that includes the same entity). Since entities, unlike keywords, are capable of independent existence and include a unique identifier that distinguishes among multiple entities with similar names, the tool can identify the same entity and closely related entities. The tool may then identify additional entities, different from the first entity, that are being used by other content providers for content selection, but not being used by the first content provider. The additional entities may refer to entities that are closely related to the first entity because they are in the same content group as the first entity. Since entities include a unique identifier and correspond to at least one relationship with another entity, unlike keywords, in one implementation, the tool identifies additional entities that are related or linked to each other via a relational database (e.g., the same entity can be the name of a movie, and the related additional entities used by the second content provider may include the director of the movie and an actor in the movie).

In one implementation, a second provider may have a content group that includes the first entity and the additional entities, where all the content of the content group includes a link to the same landing page (e.g., all the advertisements of the content group are for the same movie). In one implementation, the additional entities may include the cast members of the movie, the names of characters in the movie, or places in the movie, etc. The tool may then suggest closely related entities to the first content provider for inclusion in the first content provider's content group. In one implementation, the tool may select a subset of the additional entities based on a frequency of occurrence threshold, performance threshold, or other metric.

In some implementations, these suggestions can be automatically generated and used as additional content selection criteria without the content provider having to add the additional selection criteria. In some implementations, these suggestions can be displayed to a content provider via a user interface so the content provider can link, associate, incorporate or otherwise indicate to a content selection server to use the additional entity to select content.

In some implementations, a content provider may opt to use the functionality disclosed herein. In some implementations, the tool can preserve the privacy and strategic advantage of content providers. For example, the tool may only suggest or use additional entities if those additional entities were used by a certain number or percentage of content providers to select content. For example, if less than 10% of content providers of the plurality of content providers were using an additional entity to select content, the tool may determine that the additional entity is unique to these content providers or provides those content providers a strategic advantage, in which case the tool may not suggest or use the additional entity to select content of the first content provider. In some implementations, the tool may determine that the entity is not worth adding because too few other content providers are using (e.g., the entity does not sufficiently improve coverage or provide enough return on investment to justify adding the entity).

In some implementations, the tool obtains anonymous computer network activity information associated with a plurality of user devices. A user of a user device can affirmatively authorize the tool to obtain network activity information corresponding to the user's user device. For example, the tool can prompt the user of the user device for consent to obtain one or more types of network activity information. The identity of the user of the user device can remain anonymous and the user device may be associated with a unique identifier (e.g., a cookie).

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 1 is an illustration of one implementation of a system 100 for refining content selection criteria to facilitate content selection via a computer network. In brief overview, the system 100 may include an entity refinement tool 120 ("tool"), which may include an interface 130, aggregator 135, entity evaluator 140, selection criteria generator 145 and database 150 that are designed and constructed to refine content selection criteria to facilitate content selection via a computer network. Each element or module of the tool 120, including, e.g., the interface 130, aggregator 135, entity evaluator 140, and selection criteria generator 145, can include at least one processing unit or other logic device such as programmable logic array engine, or module configured to communicate with the database 150. The interface 130, aggregator 135, entity evaluator 140, and selection criteria generator 145 can be separate components, a single component, or part of the entity refinement tool 120. The tool 120 can include at least one logic device such as a computing device having a processor to communicate via a network 302, for example with a client device 305 or at least one content provider 125. The tool 120 can execute on, or include at least one server 315. For example, the tool 120 can execute on at least one processor of at least one server located in at least one data center. In some implementations, the tool 120 can employ distributed computing on clusters of computers using libraries or programming for processing large data sets (e.g., MapReduce or Apache Hadoop).

Still referring to FIG. 1, and in further detail, the tool 120 includes an interface 130 designed and constructed to receive, access or otherwise obtain data as well as output data. The interface 130 can include a communication interface that facilitates communication between any module of the entity refinement tool 120. In some implementations, the interface 130 can convey information to or from content provider 125A or client devices 305. In some implementations, the interface 130 can communicate via an application layer protocol such as HyperText Transfer Protocol (HTTP).

In one implementation, the tool 120 includes an aggregator 135 that is designed and constructed to identify a first entity used to select content of a first content provider 125. In one implementation, the content provider 120 may want to display content (e.g., an advertisement, document, text, image, video) about a car to viewers of a web page via a content selection server. The content selection server (e.g., an advertisement selection server) may use content selection criteria to select content to display with, or provide to, a web page. For example, a content provider 125 that wants to display content about a car may associate the content with content selection criteria that includes a car entity with a corresponding identifier. An entity may correspond to a named entity in the physical world such as a specific location, person, group of people, media content (e.g., movies, songs, etc.), and the entity ID database 150 can include multiple entities that each have a unique identifier to distinguish among multiple entities with similar names (e.g., a Jaguar car versus a jaguar animal). A unique identifier ("ID") may be a combination of characters, text, numbers, or symbols. In some implementations, the entity ID database 150 includes hundreds, thousands, or millions of entities. One such source, for example, may be a manually created taxonomy of entities such as an entity graph of specific locations, persons, groups of people, or media content, built by a community of users. The tool 120 may obtain the classification from an internal or third-party database via network 302.

The aggregator 135, upon identifying the entity identifier associated with the first entity of the content selection criteria of the content provider, may search a database 150 that includes a plurality of content selection criteria associated with content groups of a plurality of content providers 125. Each of the plurality of content providers 125 may want to display content about a car. This content may be bundled or otherwise linked or associated via a content group data structure that includes a plurality of content (e.g., creatives, text, documents, images, video) and content selection criteria (e.g., entities). In some implementations, the tool 120 may determine that the plurality of content of a content group associated with a content provider 125 are closely related to each other, and further determine that the content selection criteria used to select content of the content group of a single content provider 125 may be relevant to selecting content of a content group of another content provider 125. In one implementation, all content of a content group may include a uniform resource locator ("URL") to the same web domain or landing page. In one implementation, the aggregator 135 may further determine that the content selection criteria are semantically similar.

The aggregator 135, upon identifying a plurality of content groups and corresponding content selection criteria (including, e.g., entities), can be further configured to identify additional entities that are different from the entities being used by the first content provider 125. In one implementation, the first content provider 125A can associate, with the first content group, content selection criteria that includes a first entity. The aggregator 135 may determine that a second content group (e.g., provided by a second content provider 125B) is associated with content selection criteria that includes the first entity as well as second and third entities. Similarly, the aggregator 135 may determine that a third content group is associated with content selection criteria that includes the first entity as well as second, third and fourth entities. The aggregator 135 may identify these entities via parsing a content selection criteria data structure stored in database 150. In some implementations, the database 150 may include a content selection criteria data structure for each content group or content provider 125. In some implementations, the database 150 may include a profile for each content provider 125 that may be associated with a content selection criteria data structure. In some implementations, each profile may include a content provider 125 identifier for each content provider 125, which may facilitate associating content selection criteria with a content provider 125.

The aggregator 135 can aggregate one or more content selection criteria associated with content groups that include the first entity. In one implementation, the aggregator 135 can aggregate or otherwise identify all the additional entities that are different from the first entity or different from all entities used by the first content provider 125 (e.g., in a data structure or table, where each row in the table includes an entity and the columns include information about the entity, such as, e.g., a content provider identifier, performance data, etc.). In some implementations, the aggregator 135 may store the aggregated entities in the database 150. In some implementations, the aggregator 135 may directly transmit the information about the aggregated entities to an entity evaluator 140. In some implementations, the aggregator 135 may identify pointers to the aggregated entities and convey the pointer information to the entity evaluator 140. In some implementations, each pointer to an entity may further be associated with performance data, or other information.

The aggregator 135 can perform one or more functions in an online mode or an offline mode. In some implementations, the aggregator 135 may perform less processor-intensive functions in an online mode to facilitate real-time processing. In one implementation, the aggregator 135 may identify entities associated with a subset of the plurality of content providers 125, rather than an entire set of content providers 125. For example, the aggregator 135 may identify entities associated with content providers 125 that are in the same provider vertical as the first content provider 125. In one implementation, a content provider vertical may refer to content providers that are associated with the same industry such as, e.g., entertainment, sports, news, education, technology, or travel. In another implementation of streamlining processing, the aggregator 135 can perform entity refinement for only top ranking entities (e.g., the most commonly occurring entities or top performing entities). For example, if the first entity is commonly used by content providers (e.g., the top 1000 most commonly used entity), then the tool may save a table in the database 150 that includes entity associations for this entity. Thus, in an offline mode, the tool 120 can obtain additional entities from this table, rather than determine additional entities in real-time.

In some implementations, processing in offline mode may include pre-computing one or more value, function, process or determination, and storing the result in a table. The result can be stored in association with an entity identifier, which can be used as a key to look up the stored result. Thereafter, if a content provider enters an entity, or the tool identifies an entity, the tool can lookup the pre-computed value in the table based on the entity identifier. In some implementations, the tool maintains the pre-computed table for the most common entities, most frequently requested entities, top performing entities, or based on another factor.

In some implementations, the tool 120 can include an entity evaluator 140 designed and constructed to evaluate the aggregated entities. In some implementations, the entity evaluator 140 may obtain performance information via database 150. In some implementations, the entity evaluator 140 can determine a performance metric for each of the aggregated entities. In some implementations, the performance metric may include, e.g., a frequency of occurrence of the entity or a metric related to the performance of the entity, such as, e.g., a click through rate, conversion rate, number of clicks within a time period, etc.

In some implementations, the entity evaluator 140 can determine the number of occurrences of an additional entity, where each occurrence refers to an occurrence in a content group. The entity evaluator 140 may further determine the number of unique occurrences by deduplicating occurrences that occur in content groups corresponding to the same content provider (e.g., to determine the number of content providers that use the first entity and the additional entity to select content in any of their content groups). For example, if a single content provider 125 has five content groups that all include a second additional entity, then the entity evaluator 140 determines this to be a single occurrence of the second additional entity rather than five separate occurrences.

In some implementations, the entity evaluator 140 can use the number of occurrences to determine a frequency of occurrence. In one implementation, the entity evaluator 140 may determine the frequency of occurrence of the entity among content groups of the plurality of content providers. In one implemenation, the entity evaluator 140 may determine that one hundred content groups associated with one hundred content providers 125 are associated with content selection criteria that includes the first entity. The entity evaluator 140 may further determine that out of the one hundred content groups associated with the one hundred content providers 125 that were searched, seventy content groups are associated with content selection criteria that includes a second entity that is different from the first entity. In some implementations, the entity evaluator 140 may represent the frequency of occurrence as a percentage (e.g., 70%) or an absolute value (e.g., 70).

In some implementations, the entity evaluator 140 may determine an additional performance metric such as a click through rate or conversion rate associated with the additional entities that are different from the first entity. In some implementations, the entity evaluator 140 may only determine the additional performance metric if the frequency of occurrence is greater than a threshold. For example, if more than 50% (or 15%, 20%, 30%, 60%, 75%, 80%, etc.) of content groups use content selection criteria that include the second entity, then the entity evaluator 140 may proceed to determine the additional performance metric. Since the tool 120 may not suggest the entity if the frequency of occurrence is below a minimum threshold, the tool 120 may first check to see if this threshold is met before determining a performance metric for the additional entity.

In some implementations, the entity evaluator 140 may obtain the performance metric via a database 150. In some implementations, the entity evaluator may predict a performance metric (e.g., predicted click through rate or predicted conversion rate). In some implementations, the entity evaluator 140 may obtain a performance metric based on historical user interaction with content selected using the additional entity. For example, if the additional entity was used to select content 1000 times, and of those 1000 times the content was selected by a user viewing the content once, then the click through rate may be one out of 1000. In another implementation, the performance metric may refer to the number of times that the entity led to a conversion (e.g., a viewer of the content performing a transaction desired by the content provider 125, such as purchasing a product, completing a survey, voting, or become a member or any other desired interaction). The entity evaluator 140 may transmit or otherwise convey performance information associated with an entity to a content selection criteria generator 145.

In some implementations, the tool 120 can include a content selection criteria generator 145 designed and constructed to associate, incorporate, link or otherwise identify additional entities that can be used to select content of a content group of the first content provider. In some implementations, the content selection criteria generator 145 can compare a performance metric of the additional entity with a performance threshold. If the performance metric of the additional entity exceeds or otherwise satisfies the performance threshold, the content selection criteria generator 145 may store or otherwise associate the additional entity with the content group data structure comprising content selection criteria used to select content of the content group of the first content provider 125.

In some implementations, the content selection criteria generator 145 may compare the performance metric with a static threshold. In some implementations, the performance threshold may be pre-defined by an administrator of the tool 120 or a user (e.g., content provider 125) of the tool 120. In one implementation, the content selection criteria generator 145 may automatically select the top three (or 5, 10, 15, etc.) performing additional entities, where performing may refer to frequency of occurrence, click through rate, conversion rate, number of clicks within a certain time period, etc. In one implementation, the content selection criteria generator 145 may determine, based on historical user interaction with content associated with the additional entity, that the click through rate for the additional entity exceeds a minimum click through rate threshold or conversion rate threshold (e.g., 0.5%, 1%, 2%, 10%, etc.).

In some implementations, the content selection criteria generator 145 may determine a dynamic performance threshold with which to compare the performance metric of an additional entity. The content selection criteria generator 145 may determine the dynamic performance threshold in an offline mode. A dynamic performance threshold may refer to an optimized performance threshold that may result in an optimal performance improvement for the content group. In one implementation, the content selection criteria generator 145 may determine that using the top ten performing additional entities to select content of the first content provider's content group may not significantly improve the performance of the content group as compared to selecting the top five performing additional entities. For example, content selection criteria including the top ten performing entities may not result in improved performance as compared to content selection criteria that includes only the top five performing entities. Performance may refer to content being selecting by the content selection server, viewers of the content selecting the content or otherwise interacting with the content, or users taking a desired action (e.g., a conversion, purchasing a product). Thus, if performance is not improved, the additional cost of including the additional entity (e.g., based on a bid price, impression price, click price) may not provide sufficient return on investment to justify including the entity.

In some implementations, the content selection criteria can automatically monitor the performance of the additional entities and then determine whether to keep all the additional entities or remove one or more additional entities. In one implementation, the content selection criteria generator 145 may determine that for a certain performance metric, the top five performing additional entities provide the optimal performance improvement to the content provider 125. The dynamic threshold may vary based on performance metric, content provider, content group, vertical, etc. For example, in the entertainment vertical, the performance threshold may include 5% click through rate, or the top five entities, while in the news vertical the performance threshold may include 10% click through rate, or top 3 entities.

In some implementations, the content selection criteria generator 145 may automatically associate or add the determined additional entities to the content selection criteria of the content group. In some implementations, the content selection criteria generator 145 may prompt the content provider 145 with a suggestion of additional entities to add. In one implementation, the content selection criteria generator 145 may display, via a user interface of the tool 120 or content provider device 125, additional entities. The content provider 125 may select one or more entities to be used as content selection criteria for a content group.

In some implementations, the content selection criteria generator 145 may automatically use the additional entities as content selection criteria based on a type of content match. In one implementation, the content provider 125 may indicate or otherwise instruct the tool 120 to use the additional entities as content selection criteria. Types of content match that refer to using additional entities as content selection criteria may include, e.g., "broad match" or "expanded match" match types. The match type may refer to the all content selection criteria of a content group or one or more content selection criteria or entity associated with a content group. In some implementations, a content provider 125 may initially associate content selection criteria, including entities, with a content group via the tool 120. Responsive to receiving an indication of an entity, the tool 120 can prompt the content provider 125 for an entity classification or automatically determine an entity classification and prompt the content provider 125 for confirmation. For example, the entity may include "jaguar" and the tool 120 may prompt the content provider to indicate whether "jaguar" refers to the car entity or animal entity. In some implementations, the content provider 125 may directly entity an entity identifier or classification such that the tool 120 may not need to generate a prompt for further information.

Upon identifying the entered entity, the tool 120 may automatically suggest one or more additional entities for the content provider 125 to add to the content selection criteria. In some implementations, the tool 120 may indicate a corresponding performance metric for each additional entity. In some implementations, the tool 120 may only display or suggest entities that satisfy a performance threshold.

In some implementations, the tool 120 may include a database 150 designed and constructed to convey information to or from one or more module or elements of the tool 120 or a resource accessible via network 302. In some implementations, the database 150 can include a plurality of databases or data structures including, e.g., content 152, content selection criteria 154, entity IDs 156, performance data 158, and content provider profiles 160. In some implementations, each data structure may include a unique identifier that links the data structure or element with a corresponding data structure. In some implementations, a single data structure may include content 152, content selection criteria 154, performance data 158 and be associated with a content provider profile 160. In some implementations, the database 150 may temporarily store information to facilitate the processing of one or more elements or modules of the tool 120.

In some implementations, the database 120 can include an entity ID database 156 or data structure, from which the tool 120 may obtain or gain access to entity classification information. In some implementations, entities may be stored in a graph database 156 where the entity data structure includes a set of nodes and a set of links that establish relationships between the nodes. The entity data structure in the graph database 156 may be non-hierarchical, which may facilitate modeling complex relationships between individual elements, and allow entity contributors to enter new objects and relationships into the underlying graph structure.

An entity may correspond to a named entity in the physical world such as a specific location, person, group of people, media content (e.g., movies, songs, etc.). Each entity includes a unique identifier that may distinguish among multiple entities with similar names (e.g., a Jaguar car versus a jaguar animal). In some implementations, the entities may include a classification based on being manually classified by users of a user device 305. In one implementation, users may access the database of entities via network 302. Users may upload at least one entity or upload multiple entities in a bulk upload. Users may classify the uploaded entities, or the upload may include the classification of at least one entity. In some implementations, upon receiving an indication of an entity, the tool 102 may prompt the user for a classification.

In some implementations, entities may be manually classified by users. Classifications may indicate the manner in which entities are categorized or structured, e.g., ontology. In one implementation, an ontological classification may include attributes, aspects, properties, features, characteristics, or parameters that entities can have. Ontological classifications may also include classes, sets, collections, concepts, or types. An ontology of "vehicle" may include: type—ground vehicle, ship, air craft; function—to carry persons, to carry freights; attribute—power, size; component—engine, body, etc. In some implementations, the manual classification includes structured data that provides a manually created taxonomy of entities. Entities may be associated with an entity type, such as people, places, books, or films, for example. Entity types may include additional properties, such as date of birth for a person or latitude and longitude for a location, for example. Entities may also be associated with domains, such as a collection of types that share a namespace, which includes a directory of uniquely named objects (e.g., domain names on the internet, paths in a uniform resource locator, or directors in a computer file system). Entities may also include metadata that describes properties (or paths formed through the use of multiple properties) in terms of general relationships.

The database 150 may include a classification of an entity based on a domain, type, and property. A domain may be American football and have an ID "/american_football". This domain may be associated with a head coach type with ID "/American_football/football_coach". This type may include a property for current team head coached with ID "/American_football/football_coach/current_team_head_coached". Each domain, type, property or other category may include a description. For example, "/American_football/football_coach" may include the following description: "'Football Coach' refers to coaches of the American sport Football."

In some implementations, the tool 120 can scan text or other data of a document or content and automatically determine a classification. In one implementation, the tool 120 may scan information resources via network 105 for information about football coaches, and classify that information as "/American_football/football_coach". The tool 120 may further assign the entity football coach a unique identifier that indicates a classification.

Entities may be classified, at least in part, by one or more humans ("entity contributors"). This may be referred to as manual classification. In some implementations, entities may be classified using crowd sourcing processes. Crowd sourcing may occur online or offline and may refer to a process that involves outsourcing tasks to a defined group of people, distributed group of people, or undefined group of people. Online crowd sourcing may include assigning the task of uploading or classifying entities to an undefined set of users of user devices 305. Users may add, modify, or delete classifications online. Offline crowd sourcing may include assigning the task of uploading or classifying entities to an undefined public not using the network 302, e.g., to students in a classroom or passersby on the street or at a mall.

Figure 2:
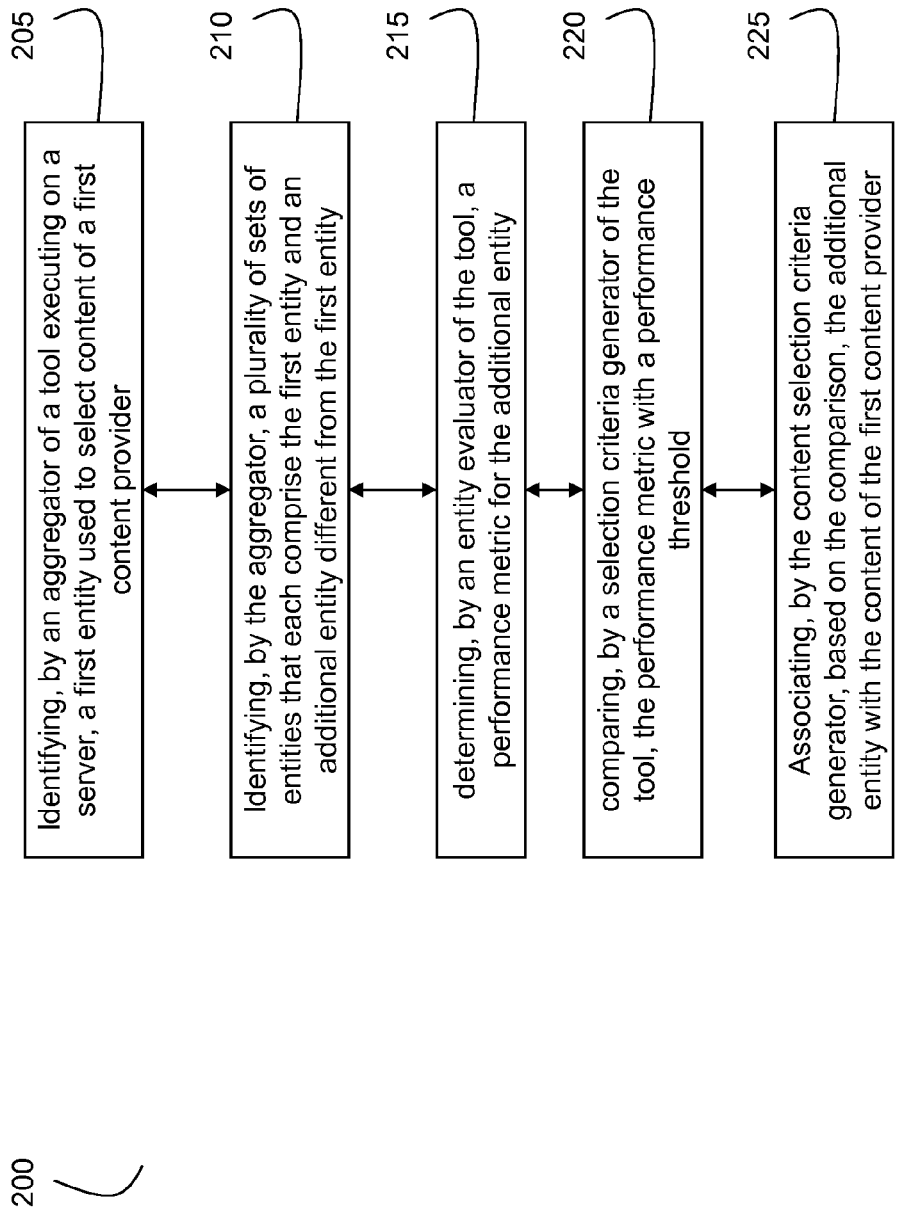
FIG. 2 is a flow chart depicting one implementation of a method for refining content selection criteria to facilitate content selection via a computer.

FIG. 2 is a flow chart illustrating one implementation of a method 200 for refining content selection criteria to facilitate content selection via a computer network. In brief overview, method 200 can include a tool executing on a server identifying a first entity used to select content of a first content provider (205). The method can include the tool identifying a plurality of sets of entities that each comprise the first entity and an additional entity different from the first entity (210). The method can include the tool determining a performance metric for the additional entity (215). The method can include the tool comparing the performance metric with a performance threshold (220). Based on the comparison, the method can include the tool associating the additional entity with the content of the first content provider (225).

In one implementation, the method 200 includes identifying a plurality of sets of entities that each comprise the first entity and an additional entity different from the first entity (210). In one implementation, an aggregator of a tool can identify the plurality of sets of entities. The first entity can correspond to a canonical stable identifier in a database. In some implementations, the tool can receive an indication of the first entity from a content provider or other user of the tool. In some implementations, the tool receives the indication of an entity and prompts a user for further information about the entity (such as entity ID, classification, content group association, product information, etc.). In some implementations, the tool, upon receiving an indication of the first entity, can associate the first entity with an entity ID in an entity database accessible via a network. In some implementations, the method includes an offline mode where the tool periodically parses content selection criteria of a plurality of content providers to identify a first entity. In one implementation, the tool may automatically determine that a new first entity was added as a content selection criteria, which may trigger automatic entity refinement.

In one implementation, the method 200 can include identifying a plurality of sets of entities that each comprise the first entity and an additional entity different from the first entity. In one implementation, an aggregator of a tool may identify a plurality of sets of entities that each comprise the first entity and an additional entity different from the first entity. Each of the plurality of sets of entities can refer to a set of content selection criteria associated with content of a content group corresponding to a content provider. In one implementation, a second content provider may use the first entity and a second entity to select content of a second content group; a third content provider may use the first entity, second entity and third entity to select content if a third content group; and a fourth content provider may use the first entity, second entity, third entity and fourth entity. The tool may identify that these three sets of entities correspond to unique content providers. In some implementations, the method may not include identifying the content provider, but merely determining that the sets of entities correspond to unique content providers.

In one implementation, the tool can identify the plurality of sets of entities that each comprise the first entity and an additional entity different from the first entity using a table lookup. In one implementation, a row of the table may include the first entity or an entity identifier corresponding to the first entity. The table may also include columns that include the additional entities corresponding to the first entity. In one implementation, the tool can identify the row of the first entity (e.g., by using the entity ID as a key to lookup the stored result) and obtain or otherwise access the additional entities by identifying one or more data cells in the same row as the first entity. In one implementation, the tool pre-computes or generates the table offline (e.g., at a prior time than the table lookup) and performs the table lookup in real time (e.g., at a time subsequent to generating the table).

In one implementation, the tool can identify the plurality of sets of entities that each comprise the first entity and an additional entity different from the first entity using a graph database where each node represents an entity and the connections between nodes represent closely related or additional entities. By identifying the connections to each node, the tool can identify the additional entities different from the first entity.

The method can include determining a performance metric for the additional entity (215). In one implementation, an entity evaluator of a tool executing on a server can determine a click through rate or conversion rate for the second additional entity, third additional entity, fourth additional entity, etc., where each additional entity is different from the first entity. In one implementation, the method can include determining the frequency of unique occurrences of an additional entity among a unique set of content providers (e.g., the number of content providers that use the first entity and the additional entity).

The method can include the tool comparing the performance metric with a performance threshold (220). In one implementation, a selection criteria generator of a tool can compare a click through rate with a click through rate threshold. The tool can compare the performance metric with the threshold to determine whether the performance metric meets the threshold, exceeds the threshold, or is below the threshold. In some implementations, the performance threshold may include a static threshold (e.g., a predefined threshold). The static performance threshold may include a predefined click through rate, conversion rate, number of clicks during a certain time period, or the top X ranking entities based on one or more performance metrics (e.g., the top 5 entities with the highest click through rates).

In one implementation, the tool compares the performance metric of an additional entity with a dynamic performance threshold, where the dynamic performance threshold is automatically optimized by the system based on performance feedback from historic user activity. In one implementation, the method may include the tool determining that adding the top ten ranking entities did not provide significantly better performing content selection as compared to adding the top five ranking entities, and thus adjust the corresponding performance threshold.

In one implementation, the method can include associating, based on the comparison, the additional entity with the content of the first content provider (225). In some implementations, the content selection criteria generator can associate the additional entity with the content selection criteria of the first content provider if the click through rate is greater than the click through rate threshold. In some implementations, the method can include the tool suggesting the additional entity to a content provider via a prompt of a user interface. The content provider may then provide an indication as to whether to include the additional entity as content selection criteria for content of a content group.

In one implementation, the method can include the tool automatically associating entities upon a request for content by a user device. In some implementations, the method can include automatically associating additional entities with content selection criteria upon receiving an indication of a content selection match type such as, e.g., "broad match" or "expanded match". The tool may receive the indication of match type when the content provider sets up or modifies the data structure associated with the content selection criteria.

In one implementation, the tool can identify the additional entities and store them in a database or otherwise link them with the first entity, without actually adding the additional entities to the content selection criteria of a content group associated with a content provider. In some implementations, the tool may perform content selection based on entity refinement without displaying the additional entities to the content provider (e.g., operating like a "black box").

In one implementation, the method may include the tool creating a plurality of temporary data structures via an offline distributed computing framework, where each temporary data structure corresponds to one or more steps in the method. In one implementation, the aggregated entities may be stored in a temporary data structure before multiple entities of a single content provider are removed (e.g., deduplication). Additionally, the unique entities may be stored in a temporary data structure until the tool determines whether the frequency of occurrence of entities exceeds a minimum threshold (e.g., more than 10% of content providers use the additional entity) such that the entity can be included as an additional content selection criteria.

Figure 4:
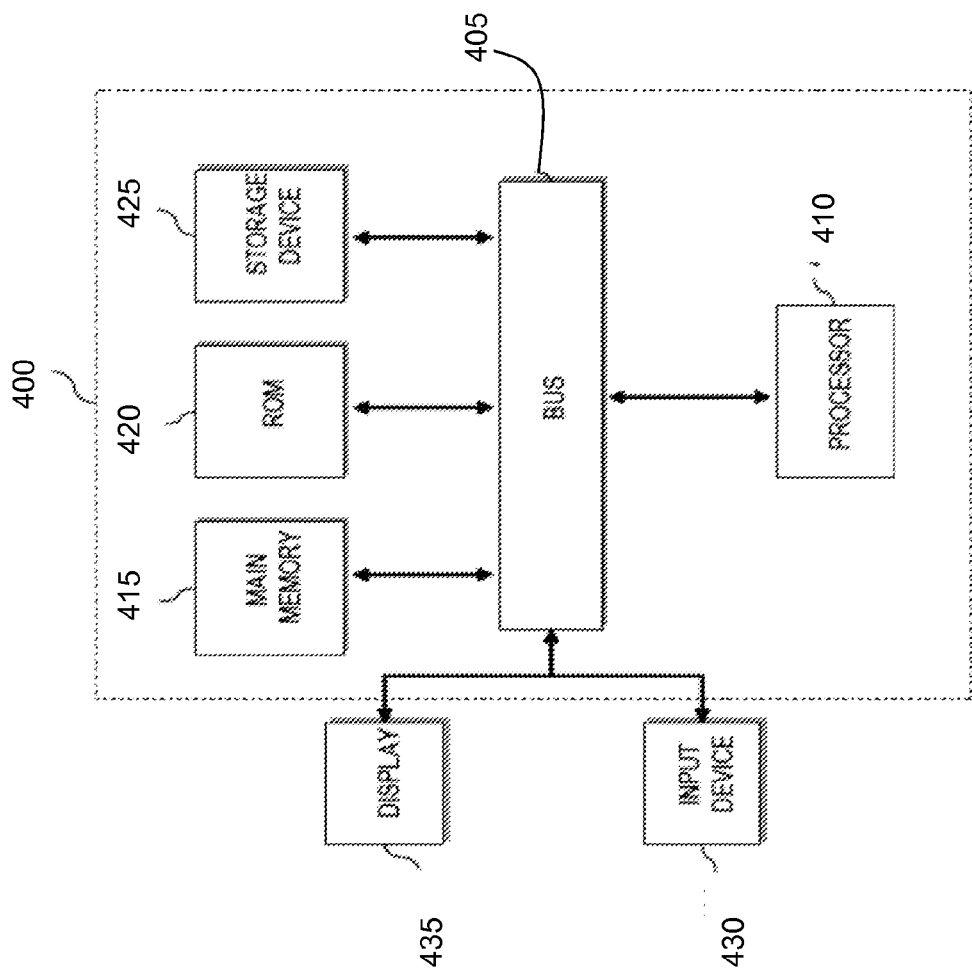
FIG. 4 is a block diagram illustrating a general architecture for a computer system that may be employed to implement various elements of the system shown in FIG. 1 and the method shown in FIG. 2.

The tool 120 and its components, such as interface 130, aggregator 135, entity evaluator 140, or selection criteria generator 145, may include hardware elements, such as one or more processors, logic devices, or circuits. FIG. 4 illustrates an implementation of a network environment 300. The system 100 and method 400 can operate in the network environment 300 depicted in FIG. 4. In brief overview, the network environment 300 includes one or more clients 305 that can be referred to as local machine(s) 305, client(s) 305, client node(s) 305, client machine(s) 305, client computer(s) 305, client device(s) 305, endpoint(s) 305, or endpoint node(s) 305) in communication with one or more servers 315 that can be referred to as server(s) 315, node 315, or remote machine(s) 315) via one or more networks 302. In some implementations, a client 305 has the capacity to function as both a client node seeking access to resources provided by a server and as a server providing access to hosted resources for other clients 305.

The network 302 can be used to access information resources such as web pages, web sites, domain names, or uniform resource locators that can be displayed on at least one user device 305, such as a laptop, desktop, tablet, personal digital assistant, smart phone, or portable computers. In one implementation, a user of the user device 305 can access, via the network 302, web pages provided by at least one web site operator 305 or 315. In one implementation, a web browser of the user device 305 can access a web server of the web site operator 315 to retrieve a web page for display on a monitor of the user device 305. The web site operator 315 generally includes a person or company that operates the web page. In one implementation, the web site operator 315 includes at least one web page server that communicates with the network 302 to make the web page available to the user device 305.

Figure 3:
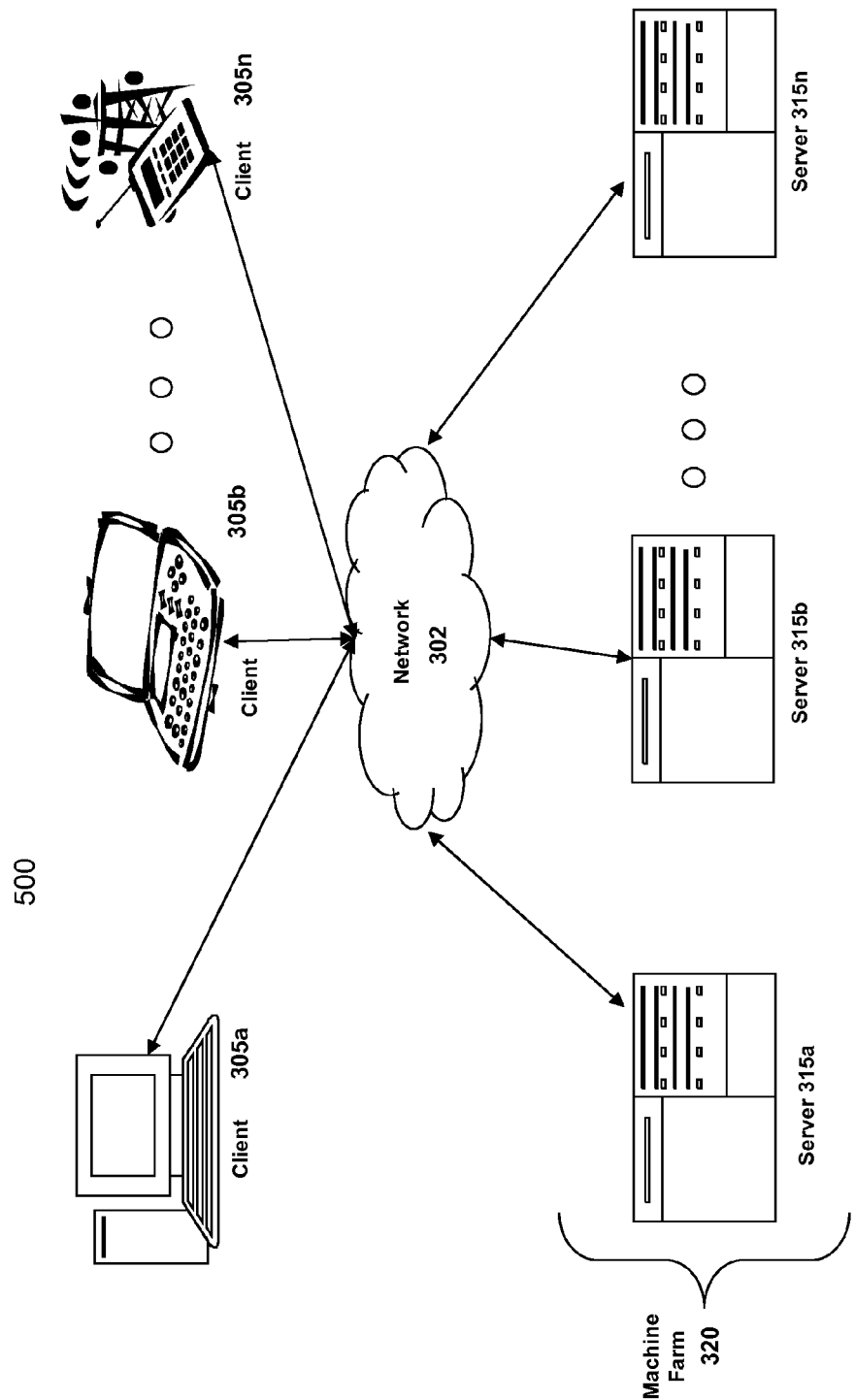
FIG. 3 shows one implementation of a network environment comprising client machines in communication with remote machines.

Although FIG. 3 shows a network 302 between the clients 305 and the servers 315, the clients 305 and the servers 315 may be on the same network 302. The network 302 can be a local-area network (LAN), such as a company Intranet, a metropolitan area network (MAN), or a wide area network (WAN), such as the Internet or the World Wide Web. In some implementations, there are multiple networks 302 between the clients 302 and the servers 315. In one of these implementations, the network 302 may be a public network, a private network, or may include combinations of public and private networks.

The network 302 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 302 may include a wireless link, such as an infrared channel or satellite band. The topology of the network 302 may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some implementations, different types of data may be transmitted via different protocols. In other implementations, the same types of data may be transmitted via different protocols.

In some implementations, the system 100 may include multiple, logically-grouped servers 315. In one of these implementations, the logical group of servers may be referred to as a server farm 320 or a machine farm 320. In another of these implementations, the servers 315 may be geographically dispersed. In other implementations, a machine farm 320 may be administered as a single entity. In still other implementations, the machine farm 320 includes a plurality of machine farms 320. The servers 315 within each machine farm 320 can be heterogeneous—one or more of the servers 315 or machines 315 can operate according to one type of operating system platform.

In one implementation, servers 315 in the machine farm 320 may be stored in high-density rack systems, along with associated storage systems, and located in an enterprise data center. In this implementation, consolidating the servers 315 in this way may improve system manageability, data security, the physical security of the system, and system performance by locating servers 315 and high performance storage systems on localized high performance networks. Centralizing the servers 315 and storage systems and coupling them with advanced system management tools allows more efficient use of server resources.

The servers 315 of each machine farm 320 do not need to be physically proximate to another server 315 in the same machine farm 320. Thus, the group of servers 315 logically grouped as a machine farm 320 may be interconnected using a wide-area network (WAN) connection or a metropolitan-area network (MAN) connection. In one implementation, a machine farm 320 may include servers 315 physically located in different continents or different regions of a continent, country, state, city, campus, or room. Data transmission speeds between servers 315 in the machine farm 320 can be increased if the servers 315 are connected using a local-area network (LAN) connection or some form of direct connection. Additionally, a heterogeneous machine farm 320 may include one or more servers 315 operating according to a type of operating system, while one or more other servers 315 execute one or more types of hypervisors rather than operating systems. In these implementations, hypervisors may be used to emulate virtual hardware, partition physical hardware, virtualize physical hardware, and execute virtual machines that provide access to computing environments.

Management of the machine farm 320 may be de-centralized. In one implementation, one or more servers 315 may comprise components, subsystems and circuits to support one or more management services for the machine farm 320. In one of these implementations, one or more servers 315 provide functionality for management of dynamic data, including techniques for handling failover, data replication, and increasing the robustness of the machine farm 320. Each server 315 may communicate with a persistent store and, in some implementations, with a dynamic store.

Server 315 may include a file server, application server, web server, proxy server, appliance, network appliance, gateway, gateway, gateway server, virtualization server, deployment server, secure sockets layer virtual private network ("SSL VPN") server, or firewall. In one implementation, the server 315 may be referred to as a remote machine or a node.

The client 305 and server 315 may be deployed as or executed on any type and form of computing device, such as a computer, network device or appliance capable of communicating on any type and form of network and performing the operations described herein.

In some implementations, a server 315 includes a content selection server that receives a request for content. The content may include, e.g., text, characters, symbols, images, video, audio, or multimedia content. In one implementation, the request for content may include a request for an online advertisement, article, promotion, coupon, or product description. The server 315 may receive the request from a computing device such as, e.g., user device 305. In some implementations, the server 315 receives the request via an application executing on the user device 305. In one implementation, a mobile application executing on a mobile device (e.g., smart phone or tablet) may make a request for content. In one implementation, a web page may request content from the server 315 responsive to a user of a mobile device 305 visiting the web page (e.g., via a mobile device 305).

In some implementations, the request for content includes information that can facilitate content selection. In some implementations, the server 315 may request information from the user device 305 to facilitate identifying content or content selection. The server 315 may request or obtain information responsive to receiving a request for content from the user device 305. The information may include information about displaying the content on the user device 305 (e.g., a content slot size or position) or available resources of user device 305 to display or otherwise manipulate the content.

FIG. 4 is a block diagram of a computer system 400 in accordance with an illustrative implementation. The computer system or computing device 400 can be used to implement the entity refinement tool 120, content provider 125, user device 305, server 315, interface 130, aggregator 135, selection criteria generator 145, entity evaluator 140 and database 150. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. In another implementation, the input device 430 has a touch screen display 435. The input device 430 can include a cursor control, such as a mouse, a trackball, or cursor direction keys, for communicating direction information and command selections to the processor 410 and for controlling cursor movement on the display 435.

According to various implementations, the processes described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "tool" or "computing device" or "data processing apparatus" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for refining content selection criteria to facilitate content selection via a computer network comprising:
identifying, by an aggregator of a tool executed by one or more processors of a server, content selection criteria including a first entity used to select content of a first content provider, the first entity corresponding to a canonical stable identifier in a database and having an attribute and a relationship to at least one other entity stored in the database;
identifying, by the aggregator, a plurality of sets of entities that each comprise the first entity and an additional entity different from the first entity, each of the plurality of sets of entities associated with content of a corresponding content provider;
determining, by an entity evaluator of the tool, a performance metric for the additional entity;
comparing, by a selection criteria generator of the tool, the performance metric with a performance threshold; and
associating, by the content selection criteria generator, based on the comparison, the additional entity with the content of the first content provider.

2. The method of claim 1, comprising:
transmitting, via an interface of the tool, to the first content provider, based on the comparison, the additional entity; and
receiving, by the content selection criteria generator, an indication from the first content provider to associate the additional entity with the content of the first content provider.

3. The method of claim 1, comprising:
comparing, by the content selection criteria generator, the performance metric with a dynamic performance threshold.

4. The method of claim 3, comprising:
determining, by the content selection criteria generator, the dynamic performance threshold based on historical performance feedback.

5. The method of claim 1, comprising:
determining, by the content selection criteria generator, that a frequency of unique occurrences of the additional entity is above a frequency threshold; and
responsive to the determination, associating, by the content selection criteria generator, the additional entity with the content of the first content provider.

6. The method of claim 5, comprising:
responsive to the determination that the frequency of unique occurrences of the additional entity is above the frequency threshold, determining an additional performance metric.

7. The method of claim 1, comprising:
entering, by the tool, an offline mode; and
storing, by the tool in a database, a table indicating an association between the first entity and the additional entity.

8. The method of claim 6, comprising:
storing, in the table, the additional entity responsive to the additional entity satisfying the performance threshold.

9. The method of claim 1, wherein the first content provider and each of the corresponding content providers are associated with an industry vertical.

10. A system for refining content selection criteria to facilitate content selection via a computer network comprising:
a tool comprising one or more servers and one or more processors;
an aggregator of the tool to identify content selection criteria including a first entity used to select content of a first content provider, the first entity corresponding to a canonical stable identifier in a database and having an attribute and a relationship to at least one other entity stored in the database;
the aggregator of the tool to identify a plurality of sets of entities that each comprise the first entity and an additional entity different from the first entity, each of the plurality of sets of entities associated with content of a corresponding content provider;
an entity evaluator of the tool to determine a performance metric for the additional entity;
a selection criteria generator of the tool to compare the performance metric with a performance threshold; and
the content selection criteria generator of the tool to associate, based on the comparison, the additional entity with the content of the first content provider.

11. The system of claim 10, comprising:
a communication interface of the tool configured to transmit, to the first content provider, based on the comparison, the additional entity; and
the content selection criteria generator configured to receive an indication from the first content provider to associate the additional entity with the content of the first content provider.

12. The system of claim 10, comprising:
the content selection criteria generator configured to compare the performance metric with a dynamic performance threshold.

13. The system of claim 12, comprising:
the content selection criteria generator configured to determine the dynamic performance threshold based on historical performance feedback.

14. The system of claim 10, comprising:
the content selection criteria generator configured to determine that a frequency of unique occurrences of the additional entity is above a frequency threshold; and
the content selection criteria generator configured to associate, responsive to the determination, the additional entity with the content of the first content provider.

15. The system of claim 14, comprising:
the entity evaluator configured to determine an additional performance metric responsive to the determination that the frequency of unique occurrences of the additional entity is above the frequency threshold.

16. The system of claim 10, comprising:
the tool configured to enter an offline mode; and
the entity evaluator configured to store, in a database, a table comprising the association between the first entity and the additional entity.

17. The system of claim 16, comprising:
the entity evaluator configured to store, in the table, the additional entity responsive to the additional entity satisfying the performance threshold.

18. The system of claim 10, wherein the first content provider and each of the corresponding content providers are associated with an industry vertical.

19. A non-transitory computer-readable storage medium comprising processor executable instructions to refine content selection criteria to facilitate content selection via a computer network, the instructions comprising instructions to:
identify content selection criteria including a first entity used to select content of a first content provider, the first entity corresponding to a canonical stable identifier in a database and having an attribute and a relationship to at least one other entity stored in the database;

identify a plurality of sets of entities that each comprise the first entity and an additional entity different from the first entity, each of the plurality of sets of entities associated with content of a corresponding content provider;

determine a performance metric for the additional entity;

compare the performance metric with a performance threshold; and associate based on the comparison, the additional entity with the content of the first content provider.

20. The computer-readable storage medium of claim 19, wherein the instructions further comprise instructions to:

determine that a frequency of unique occurrences of the additional entity is above a frequency threshold; and responsive to the determination, associate the additional entity with the content of the first content provider.

* * * * *